United States Patent [19]

Yoshitsugu

[11] Patent Number: 4,671,537
[45] Date of Patent: Jun. 9, 1987

[54] AUTOMATICALLY FASTENING SEATBELT ASSEMBLY

[75] Inventor: Noritada Yoshitsugu, Aichi, Japan

[73] Assignee: Toyota Jidosha Kabushiki Kaisha, Japan

[21] Appl. No.: 712,607

[22] Filed: Mar. 18, 1985

[30] Foreign Application Priority Data

Sep. 25, 1984 [JP] Japan .................... 59-144746[U]

[51] Int. Cl.$^4$ ............................................ B60R 21/00
[52] U.S. Cl. ............................. 280/804; 248/74.2; 248/316.7
[58] Field of Search ............... 280/804, 802; 248/74.2, 248/221.4, 231.8, 316.7

[56] References Cited

U.S. PATENT DOCUMENTS

| 1,308,869 | 7/1919 | Rohmer | 248/74.2 |
|---|---|---|---|
| 2,990,150 | 6/1961 | Weigel et al. | 248/316.7 |
| 3,016,224 | 1/1962 | Hall | 248/316.7 |
| 3,194,524 | 7/1965 | Trumbull | 248/74.2 |
| 3,842,929 | 10/1974 | Wada et al. | 280/804 |
| 4,061,365 | 12/1977 | Nagano et al. | 280/745 |
| 4,077,521 | 3/1978 | Alkins | 248/316.7 |
| 4,236,729 | 12/1980 | Suzuki et al. | 280/804 |
| 4,343,489 | 8/1982 | Suzuki et al. | 280/804 |
| 4,354,695 | 10/1982 | Sato | 280/804 |

FOREIGN PATENT DOCUMENTS 2439350  5/1980  France ...................... 248/74.2

Primary Examiner—John J. Love
Assistant Examiner—Ross Weaver
Attorney, Agent, or Firm—Parkhurst & Oliff

[57] ABSTRACT

This invention relates to an automatically fastening assembly which causes an occupant of a vehicle to be automatically held to a seat in the vehicle by a restraining webbing after the occupant is positioned upon the seat in the vehicle. The seatbelt assembly includes a guide rail, a slider which is displaceable along the guide rail and a restraining webbing which is fixed to the slider at one end thereof. The guide rail is provided with stop switches at each end thereof, the stop switches being connected to a source of electricity or an electric control circuit through connecting wires. Further, the stop switches detect the arrival of the slider at either end of the guide rail and output signals to the electric control circuit. More particularly, the present invention relates to improvements for fastening the connecting wires to the guide rail prior to installing the guide rail on the vehicle body, by utilizing a fastening device. The fastening device obviates the installation problems encountered with known devices.

5 Claims, 11 Drawing Figures

AUTOMATICALLY FASTENING SEATBELT ASSEMBLY

BACKGROUND OF THE INVENTION

The present invention relates to an automatically fastening seatbelt assembly which causes an occupant of a vehicle to be automatically held to a seat in the vehicle by restraining webbing after the occupant is positioned on the seat in the vehicle. The seatbelt assembly includes a guide rail, a slider which is displaceable along the guide rail and a restraining webbing which is fixed to the slider at one end thereof. The guide rail is provided with stop switches at each ends thereof, the stop switches being connected to a source of electricity or an electric control circuit through connecting wires. Further, the stop switches detect the arrival of the slider at either end of the guide rail and output signals to the electric control circuit. More particularly, the present invention relates to improvements for fastening the connecting wires to the guide rail prior to installing the guide rail on the vehicle body, by utilizing a fastening means. The fastening means obviates the installation problems encoutered with known devices.

A similar seatbelt assembly is disclosed in U.S. Pat. No. 4,343,489. This patent discloses a seatbelt system which includes a guide rail having a longitudinal guide groove therein. The guide rail is fixed on a roof side member of a vehicle, and a slider slides within the guide groove and is displaceable along the guide rail. Further, the slider is connected to one end of a restraining webbing by an anchor plate. The guide rail is provided with a forward stop switch provided at a forward portion of the guide rail and a rearward stop switch provided at a rearward portion of the guide rail. The forward and rearward stop switches are connected to a source of electricity or an electric control circuit by connecting wires. The connecting wires supply current to the forward and rearward stop switches, which in turn can supply an output signal to the electric control circuit. When an occupant sits on the front seat in a vehicle, and the door of the vehicle is closed, the slider moves from a forward location to a rearward location as it is displaced along the guide groove, which causes the restraining webbing to move and results in the occupant being automatically restrained in the seat by the restraining webbing.

When the slider approaches the rearward stop switch on the guide rail, the slider contacts an actuator on the rearward stop switch, thereby stopping any further displacement of the slider. Conversely, when the occupant opens the door of the vehicle, the slider moves from its rearward location along the groove to a forward location, causing the retraining webbing to move away from the occupant toward the front of the vehicle. When the slider approaches the forward stop switch, the slider contacts an actuator on the forward stop switch, thereby stopping any further displacement of the slider. Thus, the occupant may exit the vehicle. Hence, this seatbelt system makes it very convenient for an occupant to be fastened in by a seatbelt.

However, this seatbelt assembly is very difficult to install in a vehicle. Specifically, it is particularly troublesome to install the guide rail and the connecting wires of the forward and rearward stop switches on the roof side member. The difficulty arises because the connecting wires often twist around the guide rail and frequently become tangled together when they are installed on the roof side member. As a result, the individual putting the assembly together must use a substantial amount of time and effort because the connecting wires must be independently secured to the roof side member after the guide rail has been installed on the roof side member.

SUMMARY OF THE INVENTION

The present invention was developed in view of the foregoing background and to overcome the foregoing drawbacks. It is accordingly an object of this invention to provide a seatbelt assembly which can be installed easily in a vehicle by a factory worker.

To achieve easy installation of the seatbelt assembly, a fastening means is provided for fastening connecting wires, which connect forward and rearward stop switches with a source of electricity or an electric control circuit, to a guide rail. The connecting wires are fastened to the guide rail prior to installing the guide rail on the vehicle body. The guide rail includes a guide groove therein, whereby a slider is displaceable along the guide groove. The slider is attached to a restraining webbing which functions as an automatic seatbelt. By providing a fastening means for fastening the connecting wires to the guide rail prior to installing the guide rail on the vehicle, a factory worker is able to use much less time and labor to install the assembly. This provides for increased productivity and decreased production costs. Thus, this invention is a significant contribution to the industry.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate different embodiments according to the present invention.

Figure 1:
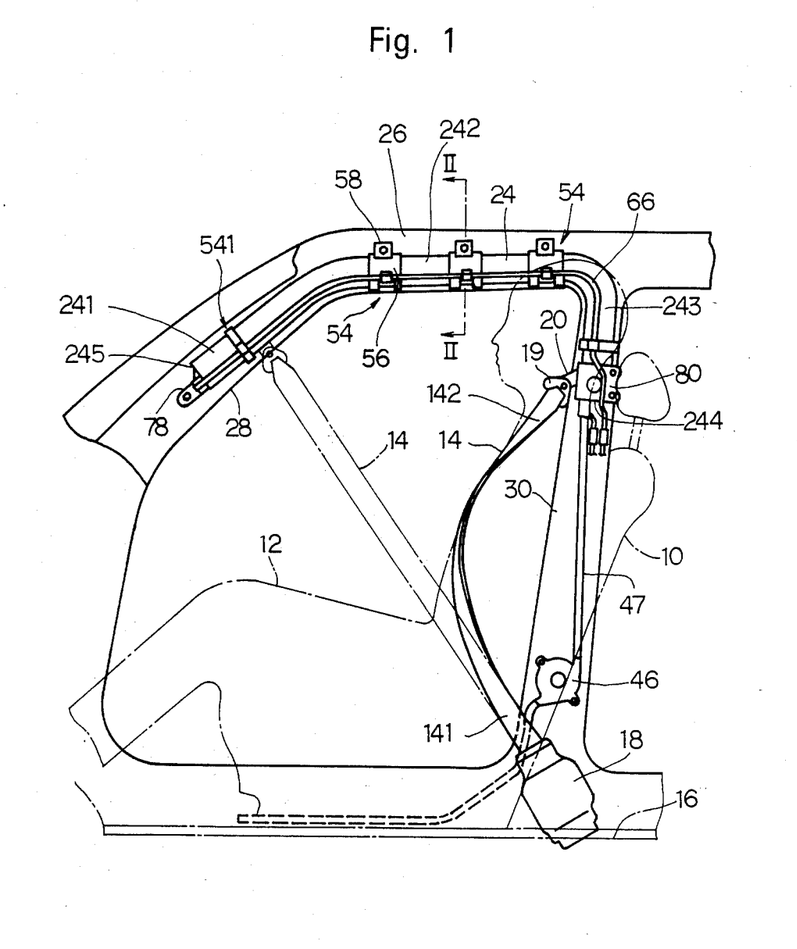
FIG. 1 is a side view of a seatbelt system according to the present invention installed on a passenger side of a vehicle, as viewed from the driver's side of the vehicle.

Referring to FIG. 1, a restraining webbing 14 is designed such that it extends and surrounds the body of an occupant 12 when the occupant is positioned upon the seat 10. Further, when the vehicle door (not shown in drawings) is opened, the location of the restraining webbing 14 is represented by the broken line. A retractor 18 winds a portion 141 of the webbing 14 therein. The retractor 18 is secured to a floor member 16 of a vehicle. The retractor 18 is located at a substantially central portion in the lateral direction of the vehicle. The retractor 18 involves a locking mechanism which prevents an abrupt windoff of the webbing 14 in an emergency situation.

Figure 2:
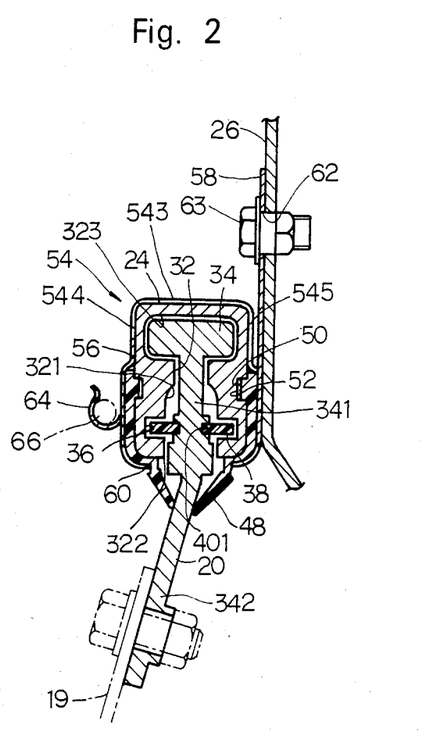
FIG. 2 is an enlarged cross-sectional view taken along the line II—II in FIG. 1, wherein a slider is disposed on the line II—II in FIG. 1.

An outer portion 142 of the webbing 14 is connected to a slider 20 by an anchor plate 19. As shown in FIG. 2, the slider 20 is located within a guide groove 32 defined within a guide rail 24. The guide rail 24 is fixed on a front pillar 28, a roof side member 26 and a center pillar 30 of the vehicle. A slanted front portion 241 of the guide rail 24 is secured to the front pillar 28. A horizontal central portion 242 of the guide rail 24 is secured to the roof side member 26. A vertical rear portion 243 of the guide rail 24 is secured to the center pillar 30. Further, the guide groove 32 extends in the longitudinal direction along the guide rail 24, and the slider 20 is longitudinally displaceable along this guide groove 32.

As shown in FIG. 2, the slider 20 includes a head portion 34 and a body portion 341, such that the slider 20 is substantially T-shaped in cross section. The body portion 341 includes a leg portion 342 at a lower end thereof. The head portion 34 is slidably received in a head groove 323. The body portion 341 includes an installing hole 401, which receives a driving tape 38. The driving tape 38 and the body portion 341 are displaceable throughout a guiding slip 322 which extends along the longitudinal direction of the guide rail 24. The driving tape 38 is displaceable within a tape groove 36, and the driving tape 38 perpendicularly intersects an intermediate portion 321 of the guide groove 32. The tape groove 36 also extends along the longitudinal direction of the guide rail 24. More specifically, the driving tape 38 is displaceable along the tape groove 36 such that the slider 20 can move between a forward a portion 245 and a rearward portion 244 of the guide rail 24.

The anchor plate 19 is rotatably connected to a lower end of the leg portion 342 of the slide 20 by a nut and a bolt assembly.

The guide rail 24 includes mounting groove 52 which are longitudinally provided along the guide rail 24. The mounting grooves 52 can be continuously or intermittently formed in both side surfaces of the guide rail 24. Lips 48 conceal the guiding slit 322 of the guide groove 32 to improve the aesthetic appearance of the assembly. Further, projections 50 of the lips 48 are received and held within the mounting grooves 52.

Figure 3:
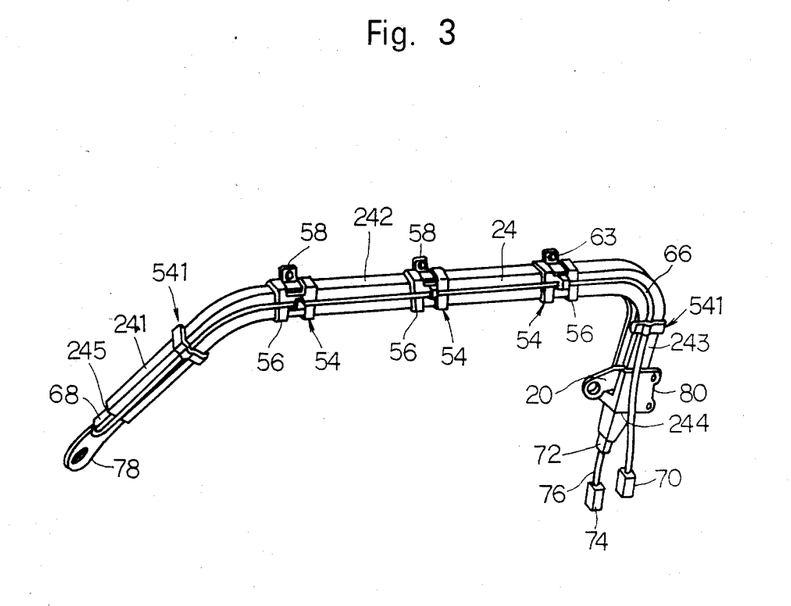
FIG. 3 is an enlarged perspective view of a guide rail according to the present invention which is ready to be installed in a vehicle.

FIG. 3 discloses that a forward stop switch 68 is located on the front end 245 of the guide rail 24, and a rearward stop switch 72 is located on the rear end 244 of the guide rail 24. The forward stop switch 68 and the rearward stop switch 72 are fixed to the guide rail by anchor brackets 78 and 80, respectively. The forward stop switch 68 and the rearward stop switch 72 are provided with actuators (not shown in the drawings) which come into contact with the head portion 34 of the slider 20 when the slider 20 reaches the front end 245 or the rear end 244 of the guide rail 24. When the slider 20 contacts the actuator of either of the stop switches 68 or 70, the movement of the slider 20 and the driving tape 38 is terminated.

Figure 4:
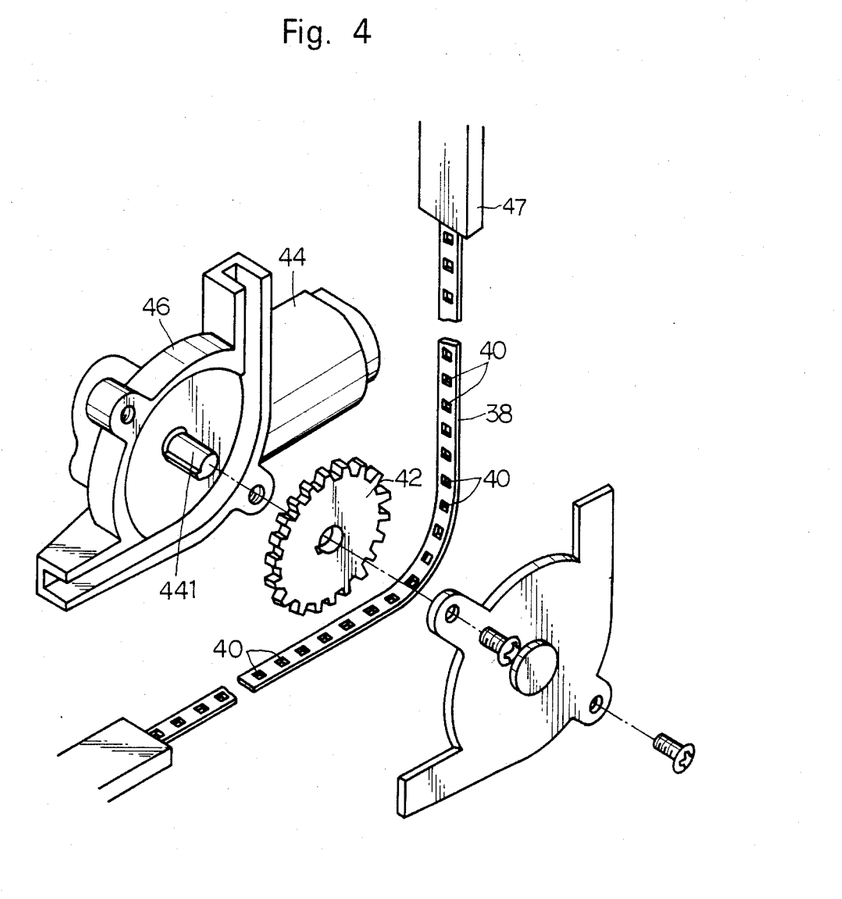
FIG. 4 is an enlarged perspective view showing components of a driving means in a disassembled condition for driving a tape which is connected to the slider at one end thereof.

Furthermore, as shown in FIG. 1, the rearward end 244 of the guide rail 24 is connected to a tape track 47, which includes a tape groove therein (not shown in the drawings). This tape groove communicates with the tape groove 36 of the guide rail 24. A lower end of the tape track 47 is in contact with a sprocket housing 46, which is secured to a lower portion of the center pillar 30. As shown in FIG. 4, rectangular openings 40 of the driving tape 38 mesh with a sprocket wheel 42, which is pivotally supported in the sprocket housing 46. The sprocket wheel 42 is adapted to be rotated by an output shaft 441 of a motor 44, and when the sprocket wheel 42 rotates, it drives the driving tape 38 such that it moves along the tape track 47 and the guide rail 24. The movement of the driving tape 38 causes the slider 20 to move between the forward and rearward ends of the guide rail 24.

The motor 44 displaces the driving tape 38 whenever an occupant enters the vehicle or prepares to exit the vehicle. For example, when an occupant sits on the seat 10 of the vehicle and closes the door, the sprocket wheel 42 turns in a clockwise direction (with respect to FIG. 4), whereby the slider 20 is displaced form the forward end 245 of the guide rail 24 toward the rearward end 244. The slider 20 stops when it reaches the rearward stop switch 72. Conversely, when an occupant opens the door, the sprocket wheel 42 turns in a counter-clockwise direction, whereby the slider 20 is displaced from the rearward end 244 of the guide rail 24 toward the forward end 245.

Figure 5:
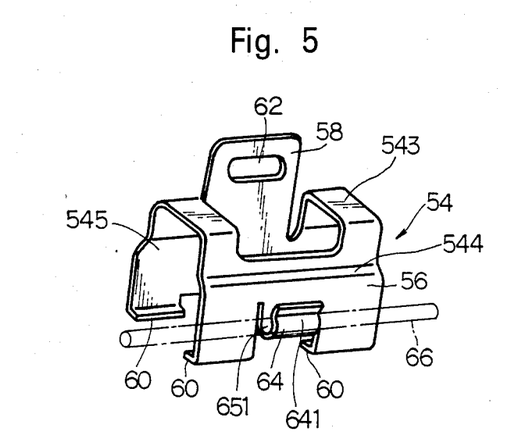
FIG. 5 is an enlarged perspective view showing fastening means of a first embodiment.

A first embodiment of a hanger which fixes the guide rail 24 to the vehicle body is shown in FIG. 5. The hander 54 includes a holding portion 56, a mounting flange 58, and a clamp 64. The holding portion 56 holds or supports the guide rail 24. The holding portion 56 includes a top horizontal plate 543, an inner vertical plate 544 and an outer vertical plate 545. The inner vertical plate 544 extends downwardly from an inner edge of the top horizontal plate 543, while the outer vertical plate 545 extends downwardly from an outer edge of the top horizontal plate 543. The vertical plates 544 and 545 are spaced laterally apart. Further, two bent portions 60 extend horizontally toward each other from respective lower ends of each vertical plate 544 and 545. Each bent portion 60 hooks onto a lip 48 and the guide rail 24, as shown in FIG. 2. The mounting flange 58 extends upwardly from the outer vertical plate 545. The mounting flange 58 is provided with a hole 62 for inserting a mounting bolt therethrough.

The clamp 64 extends from the inner vertical plate 544 and includes a clamping tab 641. The clamp 64 is bent in such a manner to resemble a "C" or a "U" shape. The clamp 64 upwardly opens. Thus, the hanger 54 is provided with a wire receiving recess 651 opened upwardly, and defined between the inner plate 544 and the clamping tab 641. The connecting wire 66 is inserted into the wire receiving recess 651 from an upward position by downwardly inserting the wire therein. The wire receiving recess 651 has an inlet disposed on an upper portion thereof, which is defined between the inner vertical plate 544 and an end of the clamping tab 641. A portion of the inlet is narrower than the diameter of the connecting wire 66 such that the connecting wire is maintained within the clamp 64.

FIG. 3 discloses that the connecting wire 66 of the foreward stop switch 68 is fastened along the longitudinal direction of the guide rail 24 by the clamps 64. The connecting wire 66 is further fixed by fasteners 541 which are provided on the slanted front portion 241 and the vertical rear portion 243 of the guide rail 24. Hence, the connecting wire 66 is fastened securely on the guide rail 24 prior to the guide rail 24 being installed on the roof side member 26 of the vehicle. The fasteners 541 are shown in greater detail in FIG. 9.

Further, the connecting wire 66 is connected at a first end to the forward stop switch 68 and at a second end to a first connector 70. The first connector 70 can be connected with a source of electricity. Another connecting wire 76 is similarly connected at a first end to the rearward stop switch 72 and at a second end with a second connector 74. The second connector 74 can be also connected with a source of electricity.

As shown in FIG. 2, the hanger 54 is fixed to the roof side member 26 by a mounting bolt 63, and the C-shaped clamp 64 projects inward toward the passenger compartment. Thus, the connecting wire 66 is fixed securely on an inner surface of the guide rail 24.

To install the guide rail assembly 24 on the roof side member 26, a worker simply secures the hangers 54 and the fasteners 541 to the roof side member 26, and a forward anchor bracket 78 to the front pillar 28, and a rearward anchor bracket 80 on the center pillar 30, by appropriately securing a plurality of bolts 63. The prior attachment of the connecting wires 66 and 76 to the guide rail 24 obviates the prior art installation difficulties that a worker encountered with the known guide rail assemblies. Specifically, a worker does not have to manipulate the position of the connecting wire 66 because it is fixed in place by the "C" or "U" shaped clamp 64.

For a detailed discussion of how the automatic seatbelt assembly actually operates, see U.S. Pat. No. 4,343,489, which is herein incorporated by reference.

Figure 6:
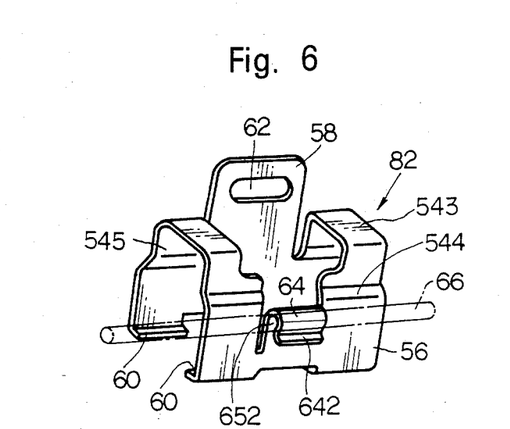
FIG. 6 is an enlarged perspective view showing fastening means of a second embodiment.

A second embodiment of a hanger which fixes the guide rail 24 to the vehicle body is shown in FIG. 6. The second embodiment is substantially similar to the first embodiment disclosed in FIG. 5. However, the major difference between the hanger 82 shown in FIG. 6 and the hanger 54 shown in FIG. 5 is that the "C" or "U" shaped clamp 64 downwardly opens rather than upwardly opens. The C-shaped clamp 64 includes a clamping tab 642 extending from a central portion of an inner vertical plate 544 of the holding portion 56, which is bent back into the shape of a "C" or "U". Thus, the hanger 82 provides a wire receiving recess 652 opened downwardly, the recess 652 being defined between the clamping tab 642 and the inner vertical plate 544. The connecting wire 66 is inserted into the wire receiving recess 652 from a downward direction by upwardly inserting the wire therein. The wire receiving recess 652 has an inlet disposed on a lower portion thereof, which is defined between the inner vertical plate 544 and an end of the clamping tab 642. A portion of the inlet is narrower than the diameter of the connecting wire 66, such that the connecting wire is maintained within the clamp 64.

Figure 7:
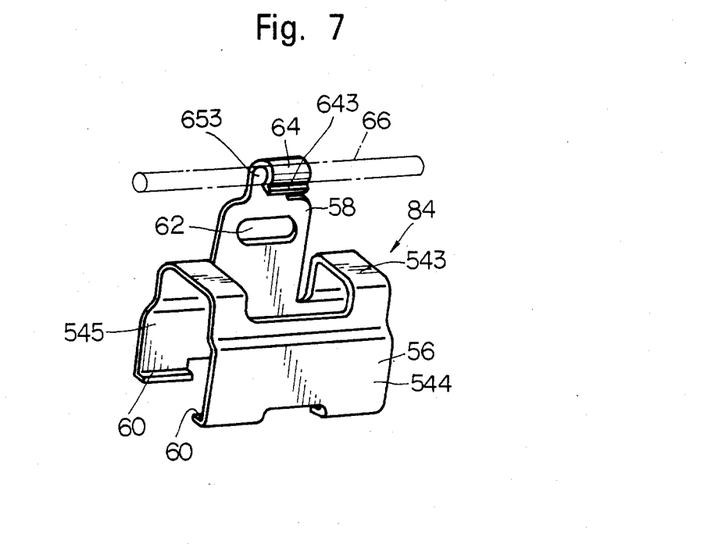
FIG. 7 is an enlarged perspective view showing fastening means of a third embodment.

FIG. 7 shows a third embodiment of a hanger which fixes the guide rail 24 to the vehicle body. The third embodiment is substantially similar to the first two embodiments shown in FIGS. 5 and 6. A hanger 84 includes a holding portion 56, a mounting flange 58 and a clamp 64. The clamp 64 includes a clamping tab 643, which extends from an upward portion of the mounting flange 58. The clamp 64 is substantially "C" or "U" shaped, with the opening being downwardly directed. Thus, the hanger 84 provides a wire receiving recess 653 opened downwardly, the recess 653 being defined between the clamping tab 643 and the mounting flange 58. The connecting wire 66 is inserted into the wire receiving recess 653 from a downward position by upwardly inserting the wire therein. The wire receiving recess 653 has an inlet disposed on a lower portion thereof, which is defined between the mounting flange 58 and an end of the clamping tab 643. A portion of the inlet is narrower than the diameter of the connecting wire 66, such that the connecting wire is maintained within the clamp 64. The positioning of the connecting wire 66 vertically above the holding portion 56 of the hanger 84 permits the hanger 84 to be narrower in width. Thus, less intrusion is made into the passenger compartment by the guide rail 24.

Figure 8:
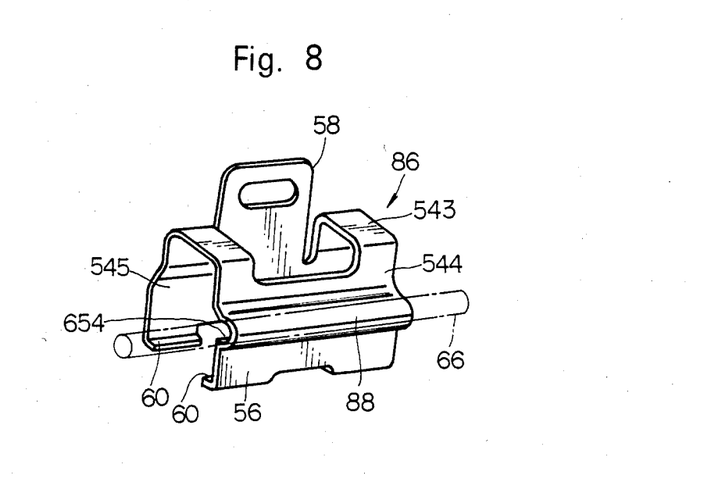
FIG. 8 is an enlarged perspective view showing fastening means of a fourth embodiment.

FIG. 8 shows a fourth embodiment of hanger for attaching the guide rail 24 to the vehicle body. This fourth embodiment is substantially similar to the other disclosed embodiments. However, a clamping portion for clamping the connecting wire is different in this embodiment. A hanger 88 includes a holding portion 56, a mounting flange 58 and a clamping portion 88. The clamping portion 88 is formed along the longitudinal length of an inner vertical plate 544 at a substantially vertical midpoint on the inner vertical plate 544. Thus, a cross-sectional view of the clamping portion 88 would reveal that it projects outwardly from the inner vertical plate 544 in the shape of a "U" or a "C", toward the passenger compartment. Hence, the hanger 86 provides a wire receiving recess 654 within the inner vertical plate 544, the opening of the recess 654 being located on an inside surface of the inner vertical plate 544. The inlet of the wire receiving recess 654 is narrower than the diameter of the connecting wire 66, such that the connecting wire is maintained within the clamp 64. The connecting wire 66 is inserted into the wire receiving recess 654 from inside the holding portion 56. Thus, the connecting wire 66 is located between the inner vertical plate 544 of the hanger 86 and the guide rail 24.

Figure 9:
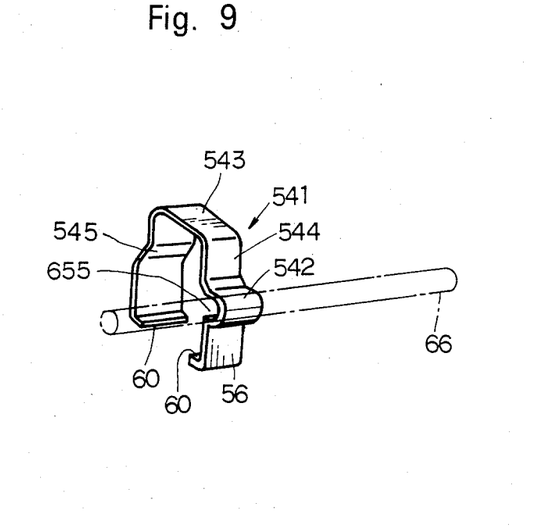
FIG. 9 is an enlarged perspective view showing fastening means of a fifth embodiment.

FIG. 9 shows a fifth embodiment of the present invention. The fifth embodiment does not include a mounting flange for attaching the fastener 541 to the vehicle body. However, the fastener 541 functions similar to the embodiment disclosed in FIG. 8. Specifically, the fastener 541 includes a holding portion 56, and a clamping portion 542. The fastener 541 provides a wire receiving recess 655, defined within an inner vertical plate 544. The inlet of the wire receiving recess 655 is opened on an inside surface of the inner vertical plate 544. The clamping portion 542 projects horizontally and outwardly from the inner vertical plate 544. Further, the inlet of the wire receiving recess 655 is narrower than the diameter of the connecting wire 66, so that when the connecting wire 66 is inserted into the wire receiving recess 655 from an inner side of the holding portion 56, the connecting wire 66 is maintained within the clamping portion 542. Thus, the connecting wire 66 is located between the inner vertical plate 544 of the fastener 541 and the guide rail 24. FIG. 3 shows that the fasteners 541 may be provided on the slanted from portion 241 and the vertical rear portion 243 of the guide rail 24.

Figure 10:
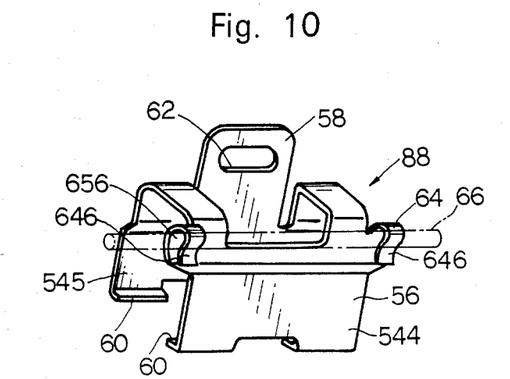
FIG. 10 is an enlarged perspective view showing fastening means of a sixth embodiment.

FIG. 10 discloses a sixth embodiment of the present invention, wherein the hanger which fixes the guide rail 24 to the vehicle body has been slightly modified. Specifically, the portion of the hanger which holds the connecting wire 66 has been modified such that it is different from the other disclosed embodiments.

A hanger 88 includes a holding portion 56, a mounting flange 58 and two clamps 64. Each of the clamps 64 includes a clamping tab 646 which extends upwardly from an inner vertical plate 544. The clamping tabs 646 have been formed into a "U" or "C" shape, having a downwardly directed opening. The clamping tabs 646 are forwardly and rearwardly located upon the inner vertical plate 544, and each of the clamping tabs 646 creates a recess 656. Each recess 656 is located between the clamping tab 646 and an outer surface of the inner vertical plate 544. Each of the wire receiving recesses 656 has an inlet disposed on a lower portion thereof, which is defined as a space between the outer surface of the inner vertical plate 544 and an end of the clamping tab 646. This inlet is narrower than the diameter of the connecting wire 66, such that when the connecting wire 66 is upwardly inserted into wire receiving recesses 656, the connecting wire 66 is maintained within the recess 656 of each clamping tab 646.

Figure 11:
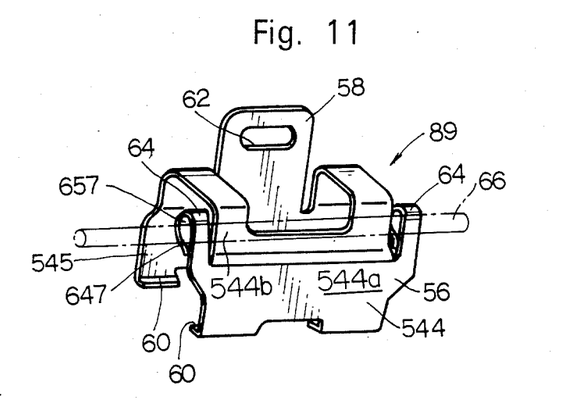
FIG. 11 is an enlarged perspective view showing fastening means of a seventh embodiment.

FIG. 11 shows a seventh embodiment of the present invention. The embodiment disclosed in FIG. 11 is substantially similar to the embodiment disclosed in FIG. 10. However, the clamping tabs of the seventh embodiment differ from the clamping tabs 646, shown in FIG. 10.

Specifically, the inner vertical plate has a lower portion 544a and an upper portion 544b. The upper portion 544b is indented from the lower portion 544a. Two clamps 64 are provided at opposite longitudinal ends of the hanger 89. Each of the clamps 64 includes a clamping tab 647 which extends upwardly from an inner vertical plate 544. However, the clamping tabs 64 are bent into a "U" or "C" shape cross section. This differs from FIG. 10, wherein the clamping tabs 647 are bent toward the inside of the hanger 89. Thus, each of the clamping tabs 647 creates a wire receiving recess 657. Moreover, a wire receiving recess is created between each of the clamping tabs 64 and the upper portion 544b of the inner vertical plate 544. When the connecting wire 66 is inserted into each wire receiving recess 657, the connecting wire 66 is in contact with an outer surface of a central portion of the inner vertical plate 544, such that the connecting wire 66 cannot be dislodged therefrom.

As described herein, the present invention overcomes the shortcomings of the known art by providing a means for fastening connecting wires to a guide rail prior to installing the guide rail in a vehicle.

While the present invention has been described in its preferred embodiments, it is to be understood that the invention is not limited thereto, and may be otherwise embodied within the scope of the following claims.

What is claimed is:

1. A seatbelt assembly for automatically fastening a restraining webbing around an occupant in a vehicle comprising:
   a guide rail having a longitudinal guide groove therein;
   a slider being displaceable along said longitudinal guide groove, said restraining webbing being fastened at one end thereof to said slider;
   a detecting device for detecting arrival of the slider at a predetermined position along the guide rail;
   a connecting wire connected to said detecting means and extending along a substantial length of said guide rail; and
   a plurality of fastening means mounting on said guide rail for fastening said connecting wire to said guide rail, said fastening means being spaced from each other along said guide rail, whereby said plurality of fastening means fasten said connecting wire to said guide rail, each of said fastening means comprising:
   a holding portion for affixing said attaching means to said guide rail, said holding portion comprising a inner vertical plate having an upper portion and a lower portion, said upper portion being indented from said lower portion, an outer vertical plate and a horizontal plate extending between said upper portion of the inner vertical plate and the outer vertical plate;
   a mounting flange for fixing said holding portion and said guide rail to the vehicle; and
   at least two clamping tabs, a first of said at least two clamping tabs being located at one longitudinal end of said holding portion and a second of said at least two clamping tabs being located at an opposite longitudinal end of said holding portion, each of said at least two clamping tabs having a transverse cross-section which is selected from the group consisting of a U-shaped and a C-shape, and each of said at least two clamping tabs being bent toward said outer vertical plate, such that a wire receiving recess is created within each of said at least two clamping tabs and between each of said at least two clamping tabs and said upper portion of said inner vertical plate, whereby said attaching means fastens said connecting wire to said guide rail such that said connecting wire is located along a substantial length of said guide rail.

2. The seatbelt assembly of claim 1, wherein said mounting flange extends from said outer vertical plate and includes a bore therethrough.

3. The seatbelt assembly of claim 1, wherein said at least two clamping tabs are fixed to said inner vertical plate.

4. An attaching means for fastening a wire to a guide rail for mounting a slider of a seat belt assembly and for fixing the guide rail to a vehicle, said attaching means comprising:
   a holding portion for affixing said attaching means to said guide rail, said holding portion comprising a inner vertical plate having an upper portion and a lower portion, said upper portion being indented from said lower portion, an outer vertical plate and a horizontal plate extending between said upper portion of the inner vertical plate and the outer vertical plate;
   a mounting flange for fixing said holding portion and said guide rail to the vehicle; and
   at least two clamping tabs, a first of said at least two clamping tabs being located at one longitudinal end of said holding portion and a second of said at least two clamping tabs being located at an opposite longitudinal end of said holding portion, each of said at least two clamping tabs having a transverse cross-section which is selected from the group consisting of a U-shaped and a C-shape, and each of said at least two clamping tabs being bent toward said outer vertical plate, such that a wire receiving recess is created within each of said at least two clamping tabs and between each of said at least two clamping tabs and said upper portion of said inner vertical plate, whereby said attaching means fastens said connecting wire to said guide rail such that said connecting wire is located along a substantial length of said guide rail.

5. The attaching means of claim 4, wherein said at least two clamping tabs are fixed to said inner vertical plate.

* * * * *